J. T. WILLIAMS.
SANITARY ATTACHMENT FOR MILK PAILS.
APPLICATION FILED OCT. 29, 1914.

1,140,224.

Patented May 18, 1915.

WITNESSES
E. M. Carraghan
W. E. Beck

INVENTOR
JOHN T. WILLIAMS,
BY Munn & Co.
ATTORNEYS ly the slit 6 may be opened widely to receive
UNITED STATES PATENT OFFICE.

JOHN THOMAS WILLIAMS, OF SAN ANTONIO, TEXAS.

SANITARY ATTACHMENT FOR MILK-PAILS.

1,140,224. Specification of Letters Patent. Patented May 18, 1915.

Application filed October 29, 1914. Serial No. 869,226.

*To all whom it may concern:*

Be it known that I, JOHN THOMAS WILLIAMS, a citizen of the United States, and a resident of San Antonio, in the county of Bexar and State of Texas, have made an Improved Sanitary Attachment for Milk-Pails, of which the following is a specification.

My invention is an improvement in sanitary attachments for milk-pails for preventing access of dust, dirt, or noxious germs to the milk during the milking operation.

The attachment comprises short open-end sleeves or tubes made of canvas or other suitable flexible material and provided with a lengthwise slit to receive the hand of the milker, and also with a finger loop for use in supporting the sleeve during the milking operation. The sleeves are further provided with a draw-string for securing them detachably to flared tubes forming a rigid attachment on the milk-pail cover.

The details of construction and arrangement of parts are as hereinafter described and illustrated in the accompanying drawing, in which—

Figure 1:
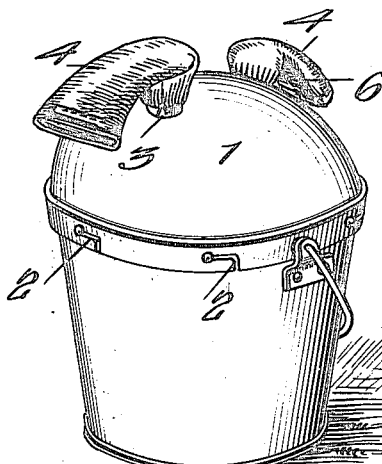
Figure 2:
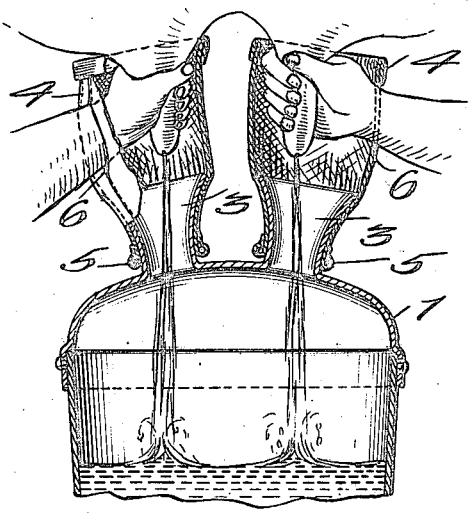
Figure 3:
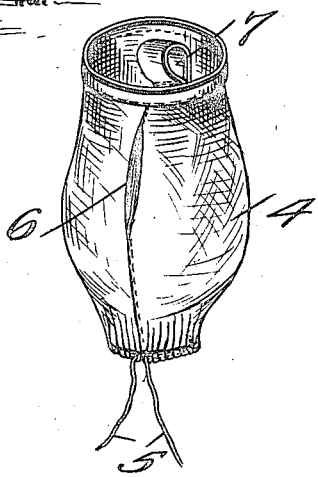
Figure 4:

Figure 1 is a perspective view of a milk-pail or bucket, provided with my improved attachment. Fig. 2 is a vertical section of the milk-pail and the attachment as in use. Fig. 3 is a perspective view of one of the sleeves or tubes constituting the chief feature of the attachment. Fig. 4 is a perspective view further illustrating the manner of applying and using the attachment.

The milk-pail or -bucket is provided with a cover 1, which is preferably constructed of tin or other thin sheet metal, and is attached to the body of the bucket by a bayonet-joint 2, so that it is firmly held thereon when in use and is at the same time adapted for convenient detachment. The upper portion of the cover 1 is provided with two flared or funnel-shaped tubes 3, and to these are attached the flexible sleeves or tubes 4, which may be made of canvas, or other fabric or material. The sleeves are secured to the metal tubes 3 of the milk-pail cover by means of a draw-string which permits their easy attachment for cleaning after the milking operation. The sleeves are provided with lengthwise slits which are of sufficient size to receive the hand of the milker. Near the top of each sleeve or tube 4 it is provided interiorly with a tape or loop 7.

It will now be understood by inspection of Figs. 2 and 4, that, in carrying out the milking operation, the pail or bucket is set on the ground or any suitable support beneath the udder of a cow, and the milker inserts his hands through the slits 6 in the sleeves 4 and seizes the teats of the cow, the upper ends of the sleeves being thus raised so as to close around the upper portion of the teats or adjacent portion of the udder. The milking operation then proceeds in the usual way and the milk is discharged through the funnel-shaped tubes of the cover into the body of the pail, without danger of access of dust, dirt, or noxious germs.

The loop 7 is arranged opposite the slit 6 to receive one of the fingers of the milker, whereby the sleeve is drawn upward and held more closely to the base of the teat during the milking operation than would be otherwise practicable. It is apparent that the slit 6 may be opened widely to receive the milker's hand, but is drawn closely around his wrist by reason of the upward pull of the loop 7.

In actual practice the udder of the cow will be cleansed of dust, dirt, etc., before the milking operation begins. When the milking operation has been completed, upon removal of the hands of the operator from the slits in the sleeves 4, the latter drop down or fold over upon the pail cover, as shown in Fig. 1, so that the admission of dust, or dirt, in transporting the pail, is effectually prevented.

The cover of the pail may be readily removed, together with the sanitary attachment when it is desired to empty the contents of the pail. The flexible sleeves or tubes may also be readily detached from the tubular projections of the milk pail cover when it is desired to clean them.

The attachment renders the straining of the milk practically unnecessary.

What I claim is:

1. A sanitary attachment for milk-pails consisting of a flexible sleeve or tube having a lengthwise slit and provided interiorly with a loop which is spaced from the slit and secured to the upper portion of the sleeve, as and for the purpose specified.

2. A sanitary attachment for milk-pails consisting of a flexible sleeve or tube having a lengthwise slit and provided at the lower end with a draw-string for securing the sleeve detachably to fixed tubes on a milk-pail cover, as specified.

3. A sanitary attachment for a milk-pail comprising a detachable pail cover having flared tubes, flexible sleeves provided with lengthwise side slits and at the lower ends with a draw-string by which the sleeves may be detachably secured to the flared tubes, as described.

JOHN THOMAS WILLIAMS.

Witnesses:
HUGH McLELLAN,
J. M. KINSAID.